United States Patent

Fetrow et al.

[15] 3,648,642
[45] Mar. 14, 1972

[54] COMMUNICATION CHANNEL BETWEEN BOAT AND MARINE CABLE DEPTH CONTROLLERS

[72] Inventors: John W. Fetrow; Kim L. Mitchell, both of Ponca City, Okla.

[73] Assignee: Continental Oil Company, Ponca City, Okla.

[22] Filed: Jan. 28, 1970

[21] Appl. No.: 6,613

[52] U.S. Cl. ............................................. 114/235 B, 340/7
[51] Int. Cl. .................................. B63b 21/00, H04b 13/02
[58] Field of Search .................... 114/235.2; 340/7 PC, 195

[56] References Cited

UNITED STATES PATENTS 3,412,704  11/1968  Buller et al. ....................... 114/235 B
3,314,009  4/1967  Murdock ............................ 340/195 X Primary Examiner—Trygve M. Blix
Attorney—Joseph C. Kotarski, Henry H. Huth, Robert B. Coleman, Jr., William J. Miller, David H. Hill and Craig, Antonelli, Stewart and Hill

[57] ABSTRACT

Method and apparatus for communicating between a ship and a seismic cable depth controlling apparatus which is attached to a seismic cable for the purpose of maintaining the seismic cable at a constant or predetermined depth which essentially comprises a generator on board ship applying a predetermined AC signal to a conductor along the length of the seismic cable. A toroidal core is clamped around the seismic cable and intercepts the current passing down the cable and converts the intercepted flux to an electrical signal which is applied to the control system of the cable depth controller.

9 Claims, 6 Drawing Figures

Patented March 14, 1972

INVENTORS.
JOHN W. FETROW
KIM L. MITCHELL
BY
*William J. Miller*
ATTORNEY

Patented March 14, 1972

INVENTORS.
JOHN W. FETROW
KIM L. MITCHELL
BY
*William J. Miller*
ATTORNEY

COMMUNICATION CHANNEL BETWEEN BOAT AND MARINE CABLE DEPTH CONTROLLERS

BACKGROUND OF THE INVENTION

1. Field of the Invention

This invention relates generally to a means of communication between a ship and a seismic cable depth controlling apparatus which is attached to a seismic cable for the purpose of maintaining the seismic cable at a constant or predetermined depth. The basic seismic cable depth control apparatus is disclosed in U.S. Pat. No. 3,375,800, with its pressure sensing actuator disclosed in U.S. Pat. No. 3,435,797. This application has particular utility in a seismic cable depth control apparatus which can be remotely controlled from the surface in a manner to cause the control apparatus to assume various predetermined depths and is particularly adaptable in such devices as disclosed in U.S. Pat. Nos. 3,434,446 and 3,412,704, all of the above patents being assigned to the same assignee as this application.

2. Description of the Prior Art

The prior art, particularly U.S. Pat. Nos. 3,412,704 and 3,434,446, discloses methods for remotely communicating with a cable depth controller. One patent discloses a remote control transmitter adapted to insert a signal into the water and with the water as the communications channel to a microphone in the depth control apparatus. The remaining patent discloses a system utilizing a microphone mounted inside the controller and in close proximity to the cable which has mounted therein adjacent the microphone a controller acoustic transmitter. Both of these systems, however, have certain inherent problems with reliable communication. For example, a control signal transmitted through the water can be reflected or refracted by water layers, wave action and the like and, as a consequence, never be received by the microphone in the cable depth control apparatus. The communication system within the cable itself is basically unsatisfactory because it requires the transmitting device to be mounted within the cable at the time the cable is built; thereby requiring a special cable for communication purposes.

SUMMARY OF THE INVENTION

The present invention contemplates a method and apparatus for communicating with a remotely mounted cable depth controller comprising an electrical loop formed by generating an AC signal using a frequency selective generator on board ship, passing the signal down a conductor in the seismic cable to the water to a point beyond the controller through the water to the ship's hull, returning to the generator to form a complete circuit. A magnetic core is mounted axially around the cable and is adapted to intercept the magnetic lines of flux generated by the electrical current passing down the conductor in the seismic cable. A coil is wrapped around the magnetic core in the manner to generate an electrical output in response to the flux generated in the core. Necessary amplifiers and control circuits are then connected to the pickup coil such that the cable depth controller can properly respond to the signals picked up by the coil.

Therefore, it is an object of the present invention to provide a system for remotely communicating with a cable depth controller which is extremely reliable.

It is a further object of this invention to provide a system for communicating with a remote cable depth controller which does not require modification of the existing seismic cables.

It is a still further object of this invention to provide a simple but reliable method for communicating with a remotely controllable cable depth controller.

Other objects and advantages of the invention will be evident from the following detailed description when read in conjunction with the accompanying drawings which illustrate the invention.

DESCRIPTION OF THE PREFERRED EMBODIMENT OF THE INVENTION

Figure 1:
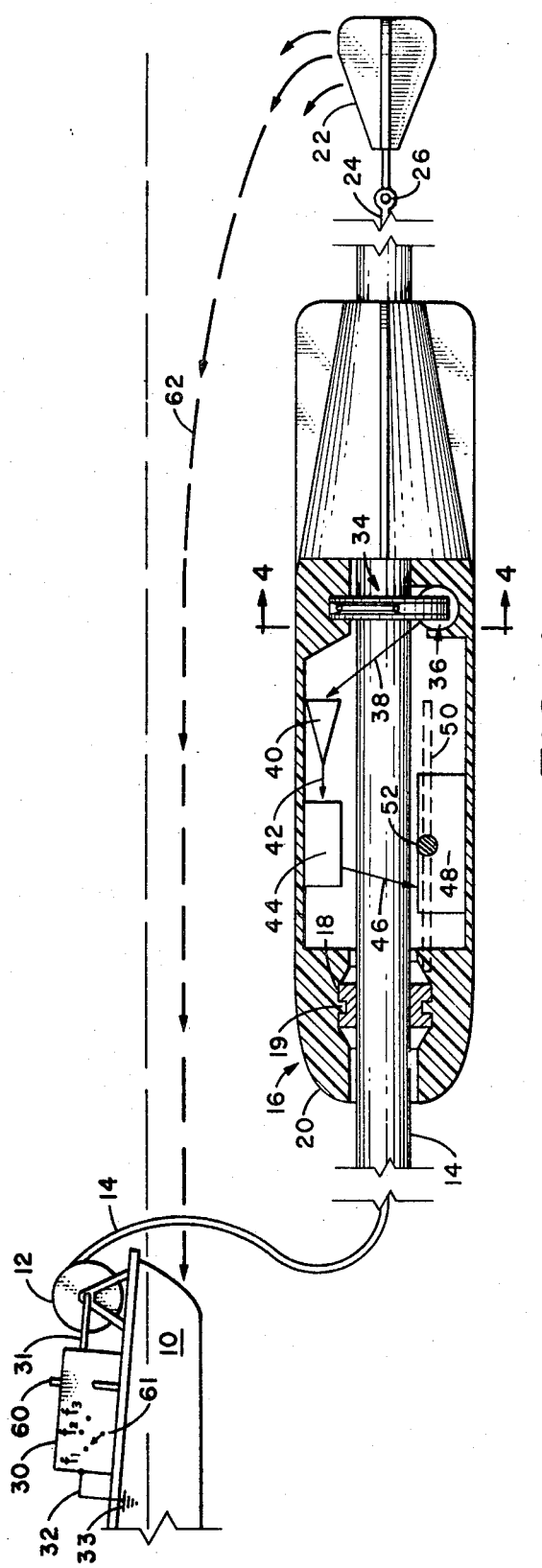
FIG. 1 is a schematic of the complete communication system showing a partial cross sectional view of one of the remote cable depth controllers in an enlarged view.

Description of the preferred embodiment of the remote cable depth control apparatus communication system is shown in FIG. 1. A ship generally referred to as 10 has mounted thereon a seismic cable reel 12 which may store up to 2 miles of seismic cable on the reel. When seismic exploration is in progress a certain amount of cable 14 is unreeled into the water containing a plurality of seismic cable depth controllers generally referred to as 16, each of which is attached to cable 14 by means of a bearing 18 rigidly secured to cable 14 and rotatably secured to a housing 20 of cable depth controller 16. A bearing insert 19 carried by housing 20 is mated in a groove in bearing 18 and prevents sliding movement of the controller down the cable and yet permits rotation of the controller about the cable. Since the basic cable depth controller is completely disclosed in U.S. Pat. No. 3,375,800, details of the construction will not be further described here.

Figure 1A:
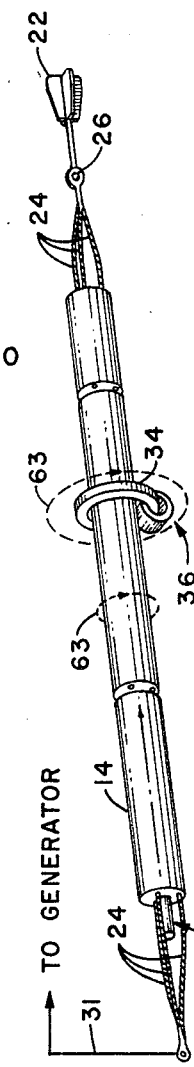
FIG. 1a is a perspective cross sectional view of a cable showing the strain wires inside the cable and the magnetic core mounted about the cable.

Referring to FIG. 1a a cross sectional perspective view of a seismic cable is illustrated showing a plurality of strain wires 24 (usually three) which normally travel the full length of the seismic cable. Since the seismic cable is usually made in sections, the strain wires are physically bolted together in order to transmit the strain uniformly to each of the connecting cable sections.

Cables of the sort herein used and described are well-known in the art. Details of the cable construction are clearly shown, for example, in the U.S. Pats. to D. E. Morrow, No. 3,376,948, and G. M. Pavey, Jr. et al., No. 3,290,645. The above patents clearly show the strain wires, methods of connecting the strain wires and details of the internal construction of the cables.

Since the strain wires are exposed at the beginning of the cable and in the end of the cable, selective frequency generator 30 mounted on board ship 10 can have a wire 31 connected through a brush (not shown) or other similar apparatus to the strain wires 24. The brush affords a continuous contact with the strain wires 24 during reeling and unreeling of the cable. It is obvious, of course, that if continuous contact is not needed during this period of time a brush would not be necessary since the generator could then be physically connected to the end of the cable once the cable is unreeled. The remaining lead for the generator is connected through a wire 32 to a grounding point 33 on the hull of ship 10. Inside the housing 20 is mounted a magnetic loop 34 which has a coil pickup 35 wrapped around the magnetic loop. The output from the coil pickup is connected through a wire 38 to an amplifier system 40 which is further connected through a wire 42 to an electrical and mechanical control system generally referred to by box 44.

A mechanical linkage means 46 couples the output of box 44 to the depth sensing means 48 in a manner to control the position of fins 50 by rotation of a shaft 52.

Figure 3:
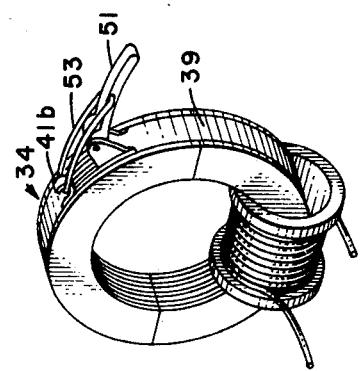
FIG. 3 is a modified version of FIG. 2.
Figure 2:
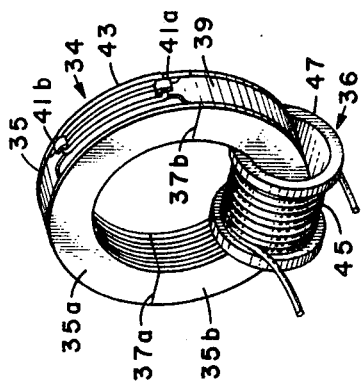
FIG. 2 is a perspective drawing of one form of magnetic loop used to receive the electrical signals transmitted down the steel strain wire.
Figure 4:
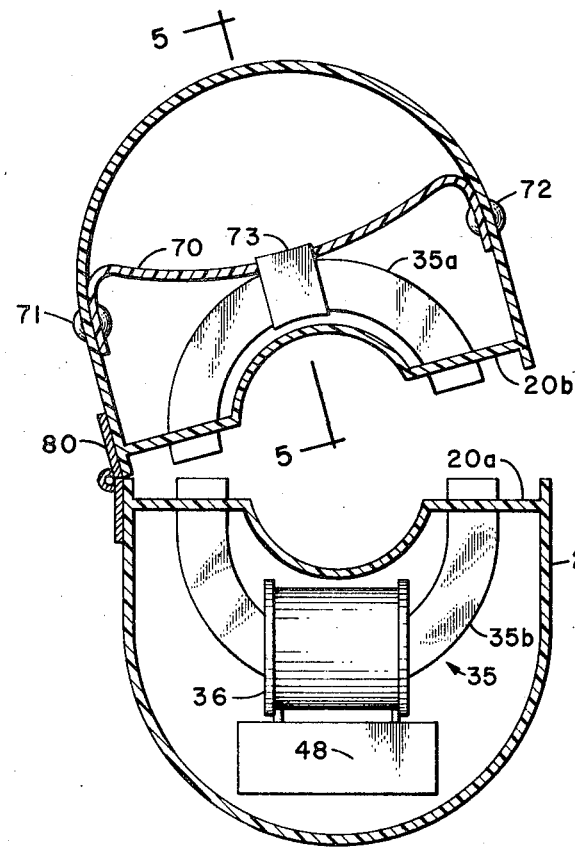
FIG. 4 shows a cross sectional view of FIG. 1 taken through the lines 4—4 showing a method of mounting the magnetic loop within the cable depth controller in a manner to eliminate snaps and clamps around the magnetic loop.

Magnetic loop 34 is further illustrated in FIGS. 2, 3 and 4 and essentially consists of a plurality of transformer core laminations 35 cut to form a toroidal configuration. A diametric cut is made along locations 37a and 37b so that the upper half 35a can be separated from the lower half 35b. A magnetic loop core fastening means comprises a metal band 39 which has a hooked end 41a and 41b biased together by means of an elastic band 43. Current pickup coils means 36 contains a plurality of turns of wire 45 on a form 47, the turns of wire being sufficient to pick up a signal being transmitted down the strain wires 24.

Referring in particular to FIG. 3, other means than the elastic means shown in FIG. 2 can be used to urge the ends of band 39 together. For example, a pivotal lever 51 can be used having a wire loop 53 adapted to fasten over end 41b in much the same manner as the elastic means 43 operates. The main purpose of band 39, of course, is to insure good physical contact at the separation points 37a and 37b so that the magnetic flux generated inside the core 35 will be high through the coil 36.

OPERATION

Referring to all of the figures in general, but in particular to FIGS. 1-4, the communication system operates in the following manner: A cable depth controller apparatus such as shown in FIG. 1 or FIG. 4 is adapted for mounting on a seismic cable by first securing bearing 18 to the seismic cable. The paravane is then opened longitudinally along hinge 60 (see FIG. 4) and bearing insert 19 is inserted in the mating groove of bearing 18. The magnetic loop which has been previously opened by removing elastic strap 43 or latch 44 along with disengaging the metal loop 53 from hook 41b, will permit the bottom portion 35b of the magnetic loop 2 (which is mounted within the housing) to be placed around the lower half of cable 14. The top half of the toroidal core 35a is then mated with the lower half and band 39 resecured around the upper half and lower half 35a and 35b respectively. The band, of course, is kept in place by replacing the elastic band 43 or closing the pivotal lever 51. The top half of housing 20 is then closed over the assembly and securely fastened (fasteners not shown) by either ¼-turn self-locking fasteners such as those made by the DZUS Company or latches similar to the pivotal latch 51.

Several of the cable control devices, as many as 7 per mile, may be connected in like manner along the seismic cable as it is lowered into the water. Fin 22 would normally, when once connected remain on the cable as a permanent attachment. It is, of course, necessary prior to putting the depth controllers into the water to have each depth sensing means set to the proper pressure for the minimum (or predetermined) operating depth depending upon the operation of the automatic controller within the housing. A frequency selective generator 30 or other type signal generating means which may transmit a continuous signal, pulses or frequency modulated signal is mounted on board ship. The control box can be any convenient location, but preferably it should be located near the depth measuring indicators for the seismic cable. It should be noted here that normally all seismic cables contain within the cable a plurality of pressure sensitive transducers. These transducers enable the operator to determine the present depth of the section of the cable containing a particular transducer. For the sake of simplification, a frequency selective generator and sensing system will be described. Such systems are fully described in their operation in either U.S. Pats. No. 3,434,446 or No. 3,412,704.

When a switch 60 is operated and frequency selector switch 61 set to a particular frequency, an alternating current signal will be generated by signal source 30 and applied between wires 31 and 32. The signal on wire 31 (see FIG. 1a) will connect electrically with strain wires 24 passing down strain wires 24 to fin 22 through the water along a path, for example, 62 to ship 10. Since wire 32 is grounded to the hull of ship 10, it will pass up wire 32 returning to signal source 30; thus fully completing the circuit. While the current from signal source 30 is passing down strain wires 24, magnetic lines of force 63 will be generated all along the strain wire, in a plane normal to the center line of each conductor. These magnetic lines of force 63 will generate a magnetic field within core 34 since core 34 intercepts the magnetic flux. It is obvious that the same total current will travel along the entire length of the strain wires; therefore, each cable controller will receive a signal of equal strength. Once a magnetic field is generated within core 34, coil 36 will generate a corresponding electrical voltage since the wires in coil 36 are at right angles to the core. The output from coil 36 is amplified by amplifier 40 and applied through connector 42 to the control circuit 44. As described in both of the previously mentioned variable depth control patents, control circuit 44 can contain frequency selective relays which in turn actuate control circuits causing vane 50 to a dive or a rise position depending upon the depth of the controller at the time the signal is received and the predetermined conditions within the controller and the selective network for operating the controller. For example, if frequency $f_1$ is the maximum depth frequency and frequency $f_2$ is the intermediate frequency and frequency $f_3$ is the minimum depth frequency, then if the controller is at the minimum depth and the signal source 30 is set to $f_3$ and switch 60 actuated, the controllers would remain at that depth. However, if the frequency signal source 30 were set to $f_1$ and switch 60 actuated, the controllers would dive to the maximum depth designed for the depth controller system. To initiate frequency $f_2$ would cause the device to seek an intermediate depth and frequency $f_3$ would return the controller to the minimum depth. It is obvious that more depths can be engineered into the system.

The main criteria for the operation of a successful system above described is that the signal generator have sufficient voltage and the core and coil be properly designed so that adequate signal is applied through amplifier 40 to operate the control system 44 without causing a malfunction—such malfunctions being, for example, the train of cable depth controllers, each being at a different depth, or failure of the system to respond at all to the signal given.

In a system designed and constructed by applicants, a signal generator was connected to a cable in the manner shown in FIG. 1 and FIG. 1a and the signal generator output voltage adjusted so that a signal current of 0.001 amperes at all control frequencies was passed through the cable. A cable depth controller 16 was fastened about the cable having a laminated core 24 with a cross sectional area of 8 ¾ inches by 7/16 inches and manufactured of the following material: 80 percent nickel alloy iron, with 17 laminations each of which is 0.019 inch thick. A coil 36 was placed about the core having 5,000 turns. Under the above conditions, it was found that voltages of 0.006 to 0.024 volts, depending on the control frequency, was generated at the output of the coil which resulted in an adequate signal for control purposes.

MODIFICATION

Figure 5:
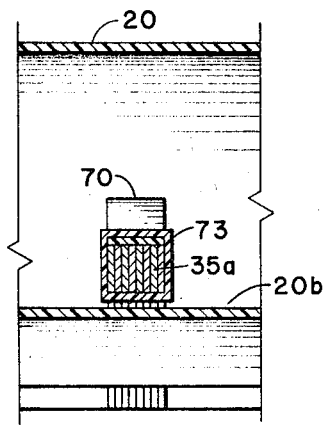
FIG. 5 is a cross sectional view of FIG. 4 taken through the lines 5—5.

Referring to FIG. 4 and FIG. 5, a modification of the coil mounting arrangement is specifically shown. In this arrangement, core 35 has its lower portion 35b mounted rigidly in the innerwall 20a of housing 20. The upper core 35a is slidably mounted in the innerwall 20b. A biasing spring 70 is attached at each end 71 and 72 to the housing 20 and to the wall by a strap 73. In order to prevent the formation of an electrical short through the core, loop strap 73 should be a non-conductor—for example, plastic. Biasing spring 70 should have sufficient strength and core 35a should be positioned properly so that when the upper and lower portions of housing 20 are closed, the upper and lower portions 35a and 35b will mate and have sufficient pressure to prevent the formation of an air gap. Also, the alignment horizontally should be sufficient so that the majority of the magnetic material is in contact and not overlapping.

It has been mentioned that the path completing the circuit is through the water. In the case of salt water, which is an extremely good conductor, the system will work extremely well. As the water becomes less of a conductor, higher voltage must, of course, be made to force the signal over the high resistance path from the end of fin 22 to the hull of the ship. Other expedients could be used if found absolutely necessary to complete the controller path—for example, a wire could be unreeled along with the cable and physically connected to the end strain wires 24 at the point 26. The preferred embodiment, of course, is designed to operate in a saline environment.

It is also obvious, of course, that a conductor other than the strain wires can be used; for example, when manufacturing a new cable a special conductor can be placed within the cable or if there is an unused conductor within an old cable such conductor can, of course, be used. If the cable contains a metal sheath of any kind insulated from the core, such metal sheath can also be used as a conductor.

The preferred embodiment of this invention discloses a toroidal core mounted around the seismic cable and normal to the axis of the seismic cable; however, it is obvious that other forms of magnetic flux pickup systems could be used—for example, a core could be mounted adjacent the seismic cable or other means sensitive to the current passing down the cable could be mounted in the controller and adapted to operate the controller on the electrical energy intercepted therein.

Although certain preferred embodiments of the present invention have been herein described in order to provide an example of its construction and steps sufficient for usage by those skilled in the art, it is to be understood that various changes and innovations in the structure described, and in the method discussed, can be effected without departure from the basic principles of the invention. Changes and revisions of this sort which continue to rely on these principles are therefore deemed to be circumscribed by the spirit and scope of the invention.

What is claimed is:

1. Apparatus for maintaining a seismic cable or the like at controlled depth positions, comprising:
   a signal source to generate a control output signal;
   a seismic cable means having a signal conductor portion connected on one end thereof to the signal source for conducting the output signal of the signal source along the length of the seismic cable;
   a seismic cable depth controller means movably connected to the seismic cable means;
   control means connected to the seismic cable depth controller means for receiving an input signal and moving the seismic cable depth controller means to predetermined depth positions in response thereto;
   magnetic signal pickup means supported within the seismic depth controller means in close proximity to a portion of the seismic cable means, the output signal conducted through the seismic cable means generating a magnetic field in the magnetic signal pickup means; and
   a current pickup coil means wound about a portion of the magnetic signal pickup means, an electrical signal being generated in the current pickup coil means via the magnetic field, a portion of the current pickup coil means connected to the control means to conduct the generated electrical signal of the current pickup coil means to the input of the control means, the generated electrical signal being the input signal to the control means.

2. The device of claim 1 wherein the magnetic signal pickup means comprises a toroidal magnetic core extending annularly about a portion of the seismic cable means, the toroidal magnetic core having a diameter larger than the external diameter of the seismic cable means.

3. The device of claim 1 wherein the signal source generates output signals of various, predetermined frequencies for controlling the depth of the seismic cable means in response thereto.

4. A device as described in claim 2 wherein said toroidal magnetic core is divided substantially diametrically into an upper half and a lower half; and means surrounding the periphery of said toroidal magnetic core to mechanically anchor said upper and lower halves to form a unitary toroidal core.

5. A device as described in claim 4 wherein said clamping band is anchored by means of an elastic strap.

6. A band as described in claim 4 which is clamped together by means of a releasable latch.

7. A device as described in claim 4 wherein the seismic cable depth controller means is divided longitudinally into upper and lower halves and wherein said lower half of said toroidal magnetic core is rigidly mounted in the lower half of said seismic cable depth controller means and said upper half is yieldably mounted in said upper half of said seismic cable depth controller means and wherein said means for maintaining mechanical contact comprises a spring.

8. A device as described in claim 1 wherein said conductor portion of the seismic cable means comprises at least one strain wire inside said seismic cable means.

9. A device as described in claim 1 defined further to include a plurality of spaced toroidal magnetic cores mounted along said seismic cable means, each of said magnetic cores mounted inside a different seismic cable depth controller means.

* * * * *